United States Patent
Nonoyama

(10) Patent No.: US 7,577,441 B2
(45) Date of Patent: Aug. 18, 2009

(54) METHOD AND DEVICE FOR DETERMINING A POSITION OF A PORTABLE ELECTRONIC DEVICE

(75) Inventor: Yoko Nonoyama, Tokyo (JP)

(73) Assignee: Motorola, Inc., Schaumburg, IL (US)

( * ) Notice: Subject to any disclaimer, the term of this patent is extended or adjusted under 35 U.S.C. 154(b) by 116 days.

(21) Appl. No.: 11/769,405

(22) Filed: Jun. 27, 2007

(65) Prior Publication Data

US 2009/0002237 A1  Jan. 1, 2009

(51) Int. Cl.
*H04W 24/00* (2006.01)
(52) U.S. Cl. .................................. 455/456.1
(58) Field of Classification Search ............. 455/456.1, 455/456.2; 340/572.4, 686.6; 342/450, 457, 342/463–465, 357.14
See application file for complete search history.

(56) References Cited

U.S. PATENT DOCUMENTS

| 6,995,708 B2 | 2/2006 | Schmidt |
| 2002/0019698 A1 | 2/2002 | Vilppula et al. |
| 2004/0092270 A1 * | 5/2004 | Banno ................ 455/456.1 |
| 2004/0185870 A1 * | 9/2004 | Matsuda .............. 455/456.1 |
| 2006/0178154 A1 * | 8/2006 | Farmer ............... 455/456.1 |
| 2007/0279281 A1 * | 12/2007 | Oda et al. ............... 342/450 |

FOREIGN PATENT DOCUMENTS

| EP | 1418439 B1 | 12/2004 |
| WO | 03107708 A1 | 12/2003 |

* cited by examiner

*Primary Examiner*—Thomas H Tarcza
*Assistant Examiner*—Fred H Mull

(57) ABSTRACT

A method for determining a position of a portable electronic device is useful for conserving power, processor and bandwidth resources. The method includes detecting at a portable electronic device a first signal received from a local terminal (step 605). In response to the first signal, a second signal is transmitted from the device, indicating a proximity of the portable electronic device to the local terminal (step 610). Positioning method priority information, which is based on a location of the local terminal and is received from the local terminal in response to the second signal, is then processed at the device (step 615). A positioning method priority list based on the positioning method priority information is then processed (step 620). Finally, the position of the portable electronic device is determined using a positioning method identified in the positioning method priority list (step 625).

20 Claims, 6 Drawing Sheets

METHOD AND DEVICE FOR DETERMINING A POSITION OF A PORTABLE ELECTRONIC DEVICE

FIELD OF THE INVENTION

The present invention relates generally to portable electronic devices, and in particular to determining a position of a portable electronic device using a positioning method selected from a positioning method priority list.

BACKGROUND

Mobile telephones and other portable electronic devices increasingly include a locating feature that enables a current geographic location of the devices to be either displayed on the devices or transmitted to a remote receiver. These features are generally called location services (abbreviated as LCS, for "LoCation Services"). LCS features that display location coordinates on a device are useful, for example, to device users who need to know where they are located relative to geographic map coordinates. Thus LCS features can enable a device user to initiate a location request where the device acts as a Global Positioning System (GPS) terminal. Also, location requests may be initiated by third parties and transmitted to a device over a wireless network. Such third party requests are useful in various circumstances. For example, mobile telephone networks may be able to improve network efficiency and provide better Quality of Service (QoS) and roaming rates to a mobile user if the network can periodically monitor a mobile telephone location. Also, emergency services can sometimes save lives by rapidly and accurately identifying where emergency phone calls have originated. Other useful location-based services and data that can be provided through portable electronic devices include maps, weather forecasts, traffic data, and local news.

Various locating technologies can be used to determine the location of a portable electronic device. For example, the Global Positioning System (GPS) can be used to identify a location anywhere in the world of some mobile telephones. However, because most mobile telephones are already operatively connected to land-based network stations, and do not need to communicate solely with satellites, Assisted GPS (A-GPS) services are commonly used to incorporate better and more efficient location services into mobile telephones. Secure User Plane Location (SUPL) is a technology developed by the Open Mobile Alliance (OMA) that concerns the transfer of assistance data and positioning data between a portable electronic device and a location platform, and includes standards such as the Open Mobile Alliance Secure User Plane Location 2.0 Periodic Trigger standard. A "user plane" means that assistance data and positioning data are transmitted between the device and the location platform over a conventional wireless communication channel such as a General Packet Radio Service (GPRS) channel. User plane communications are thus distinguished from control plane communications where assistance data and positioning data are transmitted between a device and a location platform over a separate signaling channel in a network. Before a portable electronic device can utilize the location services of a location platform, the device and the location platform generally are mutually authenticated. Such mutual authentication can include obtaining authentication data, such as shared keys, from a particular domain. For example, a particular domain associated with a location platform can be identified using a Fully Qualified Domain Name (FQDN), such as an internet protocol (IP) version 4 address, that is included in a universal integrated circuit card (UICC) that is operatively coupled to the device. The device can use the FQDN to contact the location platform and complete mutual authentication.

Other locating technologies include short-range wireless based locating technologies that measure parameters of a wireless local area network (WLAN), such as a received signal strength indicator (RSSI) or a time difference of arrival (TDOA) parameter. Still other locating technologies include other hybrid approaches that employ a combination of satellite based, cell based, and short-range wireless based locating technologies.

The various above described locating technologies and LCS applications can consume a significant amount of power and processing resources of a portable electronic device such as a mobile telephone. Acquiring location information such as geographic coordinates, and performing ancillary processes such as mutual authentication, consumes device battery power and employs processor resources that may cause other processor intensive applications of a device to be slowed down. Further, frequent transmission of such messages contributes to network congestion and can reduce network bandwidth for all network users.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
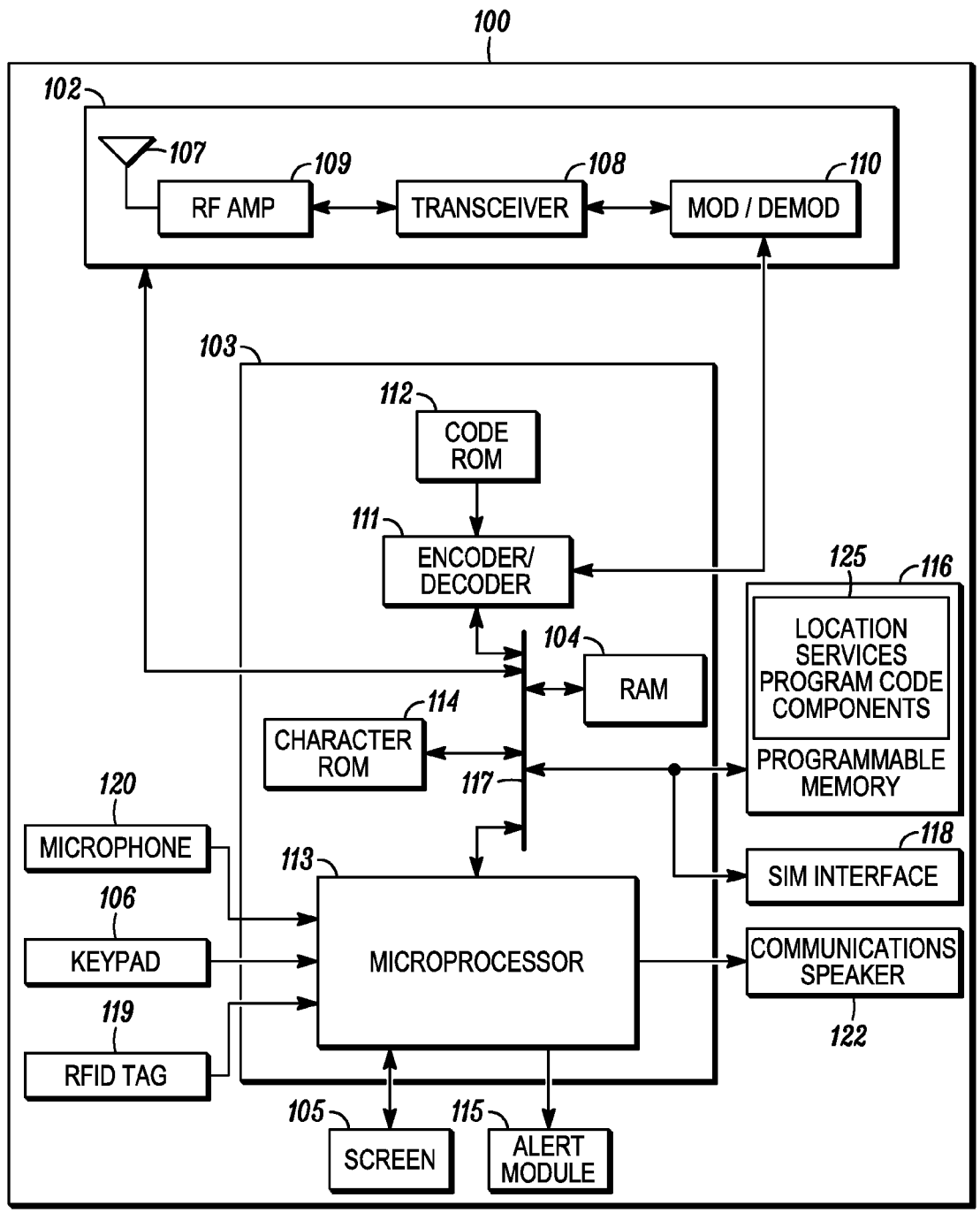
FIG. 1 is a schematic diagram illustrating a portable electronic device in the form of a mobile telephone, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to determining a position of a portable electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

According to one aspect, the present invention is a method for determining a position of a portable electronic device. The method includes detecting at a portable electronic device a first signal received from a local terminal. In response to the first signal, a second signal is transmitted from the device, indicating a proximity of the portable electronic device to the local terminal. Positioning method priority information, which is based on a location of the local terminal and is received from the local terminal in response to the second signal, is then processed at the device. A positioning method priority list based on the positioning method priority information is then processed. Finally, the position of the portable electronic device is determined using a positioning method identified in the positioning method priority list.

Some embodiments of the present invention therefore enable a portable electronic device to prioritize available positioning methods based on current circumstances or locations of the device, but without requiring the device to actually execute any of the positioning methods identified in a positioning method priority list. Then only one or more positioning methods, which are assigned a high priority level in the positioning method priority list, are executed in order to determine the position of the device. That can significantly conserve battery power and processor resources of the device, because positioning methods assigned a lower priority do not need to be executed and tested in order to determine that they should be assigned a low priority. Rather, the positioning method priority information is received directly from a local terminal, such as a radio frequency identification (RFID) card read/write terminal, that is in proximity to the portable electronic device.

Referring to FIG. 1, a schematic diagram illustrates a portable electronic device in the form of a mobile telephone 100, according to some embodiments of the present invention. The mobile telephone 100 comprises a radio frequency communications unit 102 coupled to be in communication with a common data and address bus 117 of a processor 103. The mobile telephone 100 also has a keypad 106, and a display screen 105, such as a touch screen coupled to be in communication with the processor 103.

The processor 103 also includes an encoder/decoder 111 with an associated code Read Only Memory (ROM) 112 for storing data for encoding and decoding voice or other signals that may be transmitted or received by the mobile telephone 100. The processor 103 further includes a microprocessor 113 coupled, by the common data and address bus 117, to the encoder/decoder 111, a character Read Only Memory (ROM) 114, a Random Access Memory (RAM) 104, programmable memory 116 and a Subscriber Identity Module (SIM) interface 118. The programmable memory 116 and a SIM operatively coupled to the SIM interface 118 each can store, among other things, selected text messages and a telephone number database comprising a number field for telephone numbers and a name field for identifiers associated with one of the numbers in the name field.

The radio frequency communications unit 102 is a combined receiver and transmitter having a common antenna 107. The communications unit 102 has a cell transceiver 108 coupled to the antenna 107 via a radio frequency amplifier 109. The cell transceiver 108 is also coupled to a combined modulator/demodulator 110 that is coupled to the encoder/decoder 111. For example, the cell transceiver 108 can be adapted for use with wideband code division multiple access (WCDMA), global system for mobile (GSM), or general packet radio service (GPRS) cell based communications. Other transceivers (not shown) also can be included in the radio frequency communications unit 102 for use with other radio communication systems such as the global positioning system (GPS), Bluetooth™ systems, and wireless local area network (WLAN) systems.

The microprocessor 113 has ports for coupling to the keypad 106 and to the display screen 105. The microprocessor 113 further has ports for coupling to an alert module 115 that typically contains an alert speaker, vibrator motor and associated drivers; to a radio frequency identification (RFID) tag 119; to a microphone 120; and to a communications speaker 122. The character ROM 114 stores code for decoding or encoding data such as text messages that may be received by the communications unit 102. In some embodiments of the present invention, the character ROM 114, the programmable memory 116, or a SIM also can store operating code (OC) for the microprocessor 113 and code for performing functions associated with the mobile telephone 100. For example, the programmable memory 116 can comprise location services computer readable program code components 125 configured to cause execution of a method for determining a position of the mobile telephone 100, according to some embodiments of the present invention.

Figure 2:
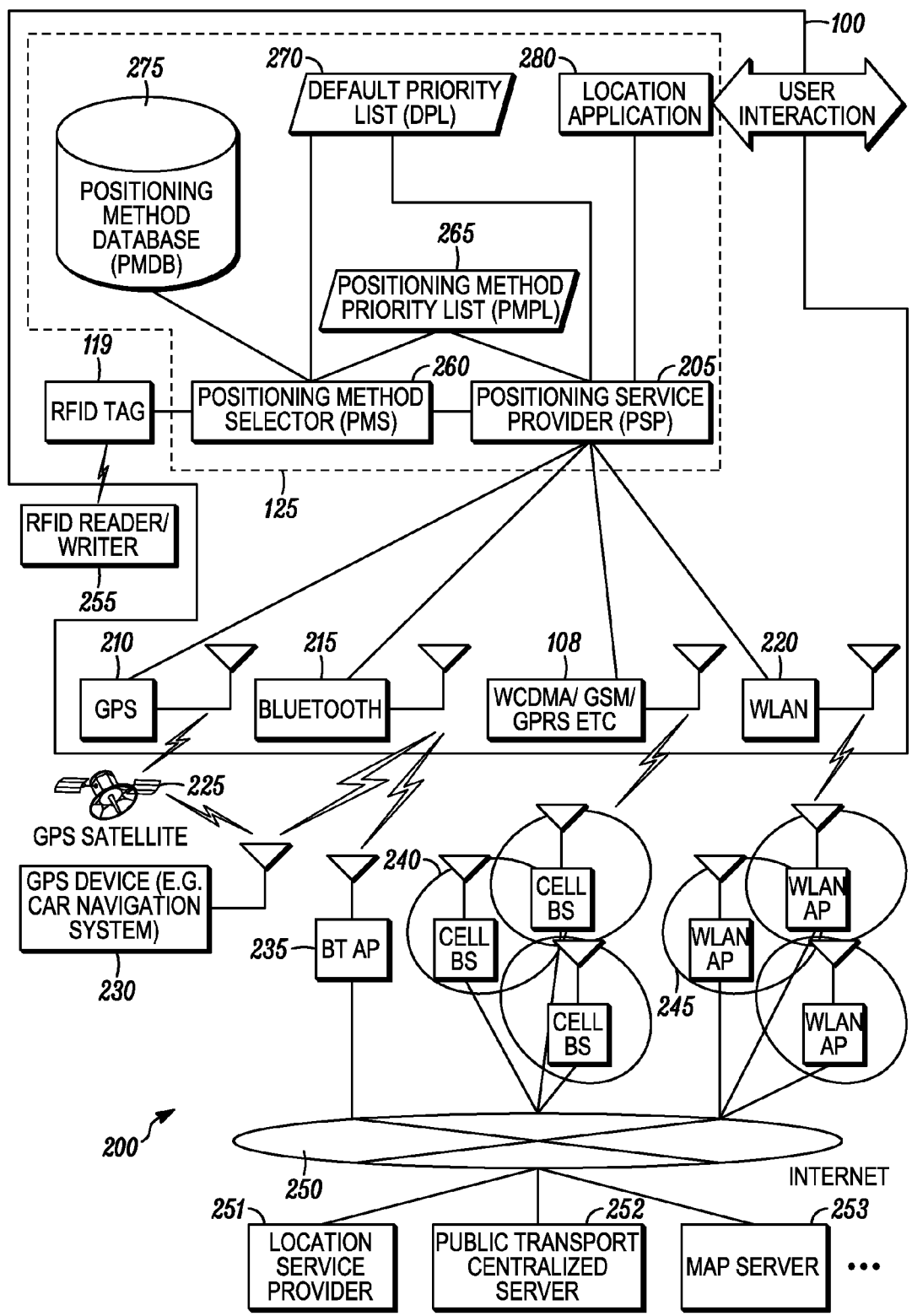
FIG. 2 is a diagram illustrating a network in which a mobile telephone interacts with a variety of locating technology systems, according to some embodiments of the present invention.

Referring to FIG. 2, a diagram illustrates a network 200 in which the mobile telephone 100 interacts with a variety of locating technology systems, according to some embodiments of the present invention. For example, the location services program code components 125 can define a positioning service provider (PSP) module 205 that interacts with the cell transceiver 108, a GPS transceiver 210, a Bluetooth™ transceiver 215, and a WLAN transceiver 220. The GPS transceiver 210 can wirelessly connect to a GPS satellite 225, the Bluetooth™ transceiver 215 can wirelessly connect to other Bluetooth™ devices such as a GPS device 230 in a car navigation system, or a base transceiver (BT) at an access point (AP) 235. The cell transceiver 108 can wirelessly connect to a network cell 240, and the WLAN transceiver 220 can wirelessly connect to a WLAN AP 245. The AP 235, network cell 240 and WLAN AP 245 can in turn operatively connect to a core network 250, such as the Internet, and obtain location information and services from for example, a location service provider 251, a public transport centralized server 252 and a map server 253.

According to some prior art techniques, determining which available positioning method at the mobile telephone 100 is best in a given circumstance or location would require employing each of the GPS transceiver 210, the Bluetooth™ transceiver 215, the cell transceiver 108, and the WLAN transceiver 220, to iteratively execute each of their respective positioning methods. The results then would be compared and prioritized. However, such testing and comparison of multiple available positioning methods wastes power, time, processor, and network resources.

According to some embodiments of the present invention, a local terminal such as an RFID reader/writer 255 provides positioning method priority information directly to the mobile telephone 100. Therefore the mobile telephone 100 can determine immediately which positioning method is appropriate in a given circumstance or location without executing any positioning method identified in a positioning method priority list.

For example, the RFID reader/writer 255 can be positioned in a vehicle equipped with the GPS device 230. Thus it may be appropriate that, when the mobile telephone 100 is located in the vehicle, location services of the mobile telephone 100 should always first use the GPS device 230 accessed through the Bluetooth™ transceiver 215. Therefore, the Bluetooth™ transceiver 215 should be at the top of a positioning method priority list whenever the mobile telephone 100 is in the vehicle. That can be accomplished by having the RFID reader/writer 255 transmit positioning method priority information directly to the RFID tag 119 in the mobile telephone 100. A positioning method selector (PMS) module 260 can then read the positioning method priority information from the RFID tag 119 and update a positioning method priority list (PMPL) 265. For example, the PMPL 265 can prioritise various positioning methods such as satellite based, cell based, short range wireless based, radio frequency identification based, and hybrid positioning methods. The positioning service provider (PSP) module 205 can then obtain a preferred positioning method from the PMS module 260 and activate an appropriate transceiver such as one of the transceivers 108, 210, 215, or 220.

According to another example, the RFID reader/writer 255 can be associated with an electronic lock to a building, such as a home or office. The RFID tag 119 in the mobile telephone 100 then can function as an electronic key. Thus each time a user of the mobile telephone 100 enters or leaves the building, the RFID tag 119 communicates with the RFID reader/writer 255. While the user is inside the building, a preferred location technology may be accessed through the WLAN network 245 using the WLAN transceiver 220. Therefore, each time the user enters the building the RFID reader/writer 225 transmits positioning method priority information to the RFID tag 119 that identifies use of the WLAN transceiver 220 as the most preferred positioning method.

Still other examples include placing the RFID reader/writer 255 in public locations such as bus stations, train stations, concert halls, shopping centers, and various public buildings. The RFID reader/writer 255 then can be programmed to identify a single preferred positioning method, or a ranked list of a plurality of positioning methods, appropriate for that particular public location. Each time a user of a portable electronic device such as the mobile telephone 100 is in close proximity, the RFID reader/writer 255 transmits the appropriate positioning method priority information to the electronic device, such as to the RFID tag 119.

Those skilled in the art will appreciate that other means of communicating between a portable electronic device and a local terminal are also enabled by the present invention. For example, rather than employing the RFID tag 119 and the RFID reader/writer 255, other localized communication methods can be employed such as Near Field Communications, felicity card (FeliCa) communications, or Mifare communications.

According to some embodiments of the present invention, the positioning method priority list can be changed to a default priority list after the expiration of a predetermined time period. For example, the location services program code components 125 can further define a default priority list (DPL) 270 that defines a positioning method priority list for use when no other suitable priority list is identified. For example, the positioning method selector (PMS) 260 can set a timer when the positioning method priority list (PMPL) 265 is changed. If a further update to the PMPL 265 is not processed before expiration of the timer, then the PMPL 265 is reset to the DPL 270. A positioning method database (PMDB) 275 can be used to store effective time periods and other attributes associated with various positioning methods.

A location application module 280 can be used to process requests for location services (LCS) from various sources. For example, such requests can include mobile terminated location requests (MTLRs), network initiated location requests (NILRs), or mobile originated location requests (MOLRs). MTLRs are location requests that are initiated by another network user, such as other mobile stations, websites or information services. NILRs are location requests that are received from a mobile network where the network is not requesting verification or notification. Typically, NILRs are used for locating mobile stations for emergency or law-enforcement purposes. MOLRs are location requests that originate from the mobile telephone 100 itself, such as when a user of the mobile telephone 100 requests his or her location.

Figure 3:
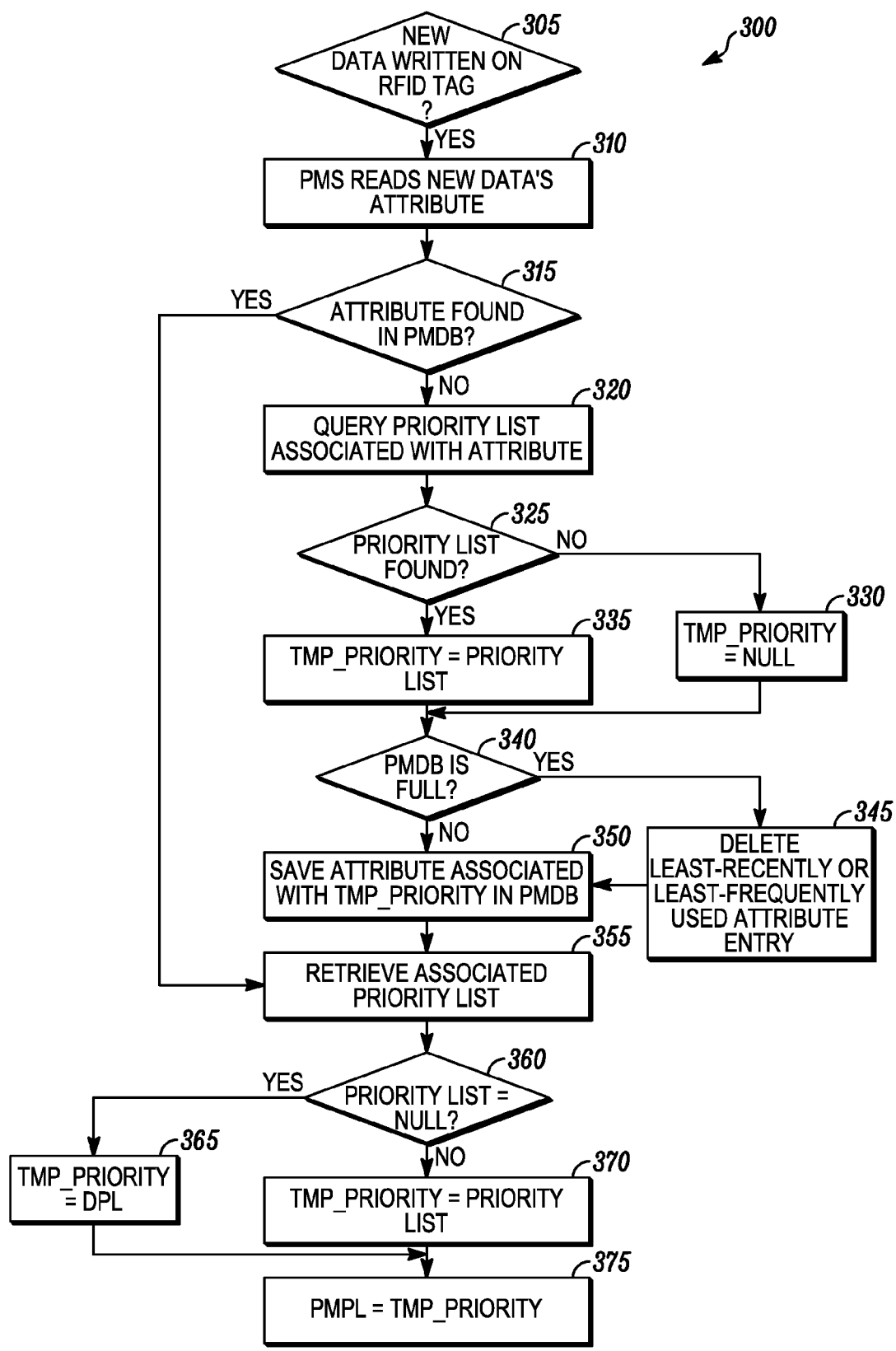
FIG. 3 is a flow diagram illustrating a method of updating a positioning method priority list (PMPL) based on positioning method priority information received from a radio frequency identification (RFID) tag in a mobile telephone, according to some embodiments of the present invention.

Referring to FIG. 3, a flow diagram illustrates a method 300 of updating the positioning method priority list (PMPL) 265 based on positioning method priority information received from the RFID tag 119, according to some embodiments of the present invention. Before the method 300 begins, when the mobile telephone 100 is first powered on, the PSP 205 copies data from the DPL 270 to the PMPL 265. Then, at step 305, it is determined whether new data has been written on the RFID tag 119. If so, at step 310, the PMS 260 reads an attribute from the new data. At step 315, it is determined whether the attribute is already stored in the PMDB 275.

At step 320, if the attribute is not already stored in the PMDB 275, then a search for a priority list associated with the attribute is performed. For example, databases provided on the Internet by LCS providers, or by owners of the RFID reader/writer 255, such as rail station companies or facility management companies, can be searched to obtain a priority list. Then at step 325 it is determined whether a priority list was found. If not, at step 330 a TMP_PRIORITY field is assigned a null value; if so, at step 335 the TMP_PRIORITY field is assigned the value of the found priority list. Next, at step 340, it is determined whether the PMDB 275 is full. If so, at step 345 a least recently or least frequently used attribute entry is deleted from the PMDB 275; if not, at step 350 the found attribute associated with the TMP_PRIORITY field is saved in the PMDB 275.

At step 355, the priority list associated with the found attribute is retrieved. Next, at step 360 it is determined whether the priority list is empty. If so, at step 365 the TMP_PRIORITY field is assigned a value corresponding to the DPL 270; if not, at step 370 the TMP_PRIORITY field is assigned a value corresponding to the found priority list associated with the attribute. Finally, at step 375, the PMPL 265 is defined as the priority list identified by the TMP_PRIORITY field.

An effective time for each attribute also can be specified and stored in the PMDB 275 so that a selected priority list will expire after the effective time. The PMPL 265 then will be overwritten with the DPL 270. That prevents the PMPL 265 from maintaining an out of date, context-specific priority list.

Figure 4:
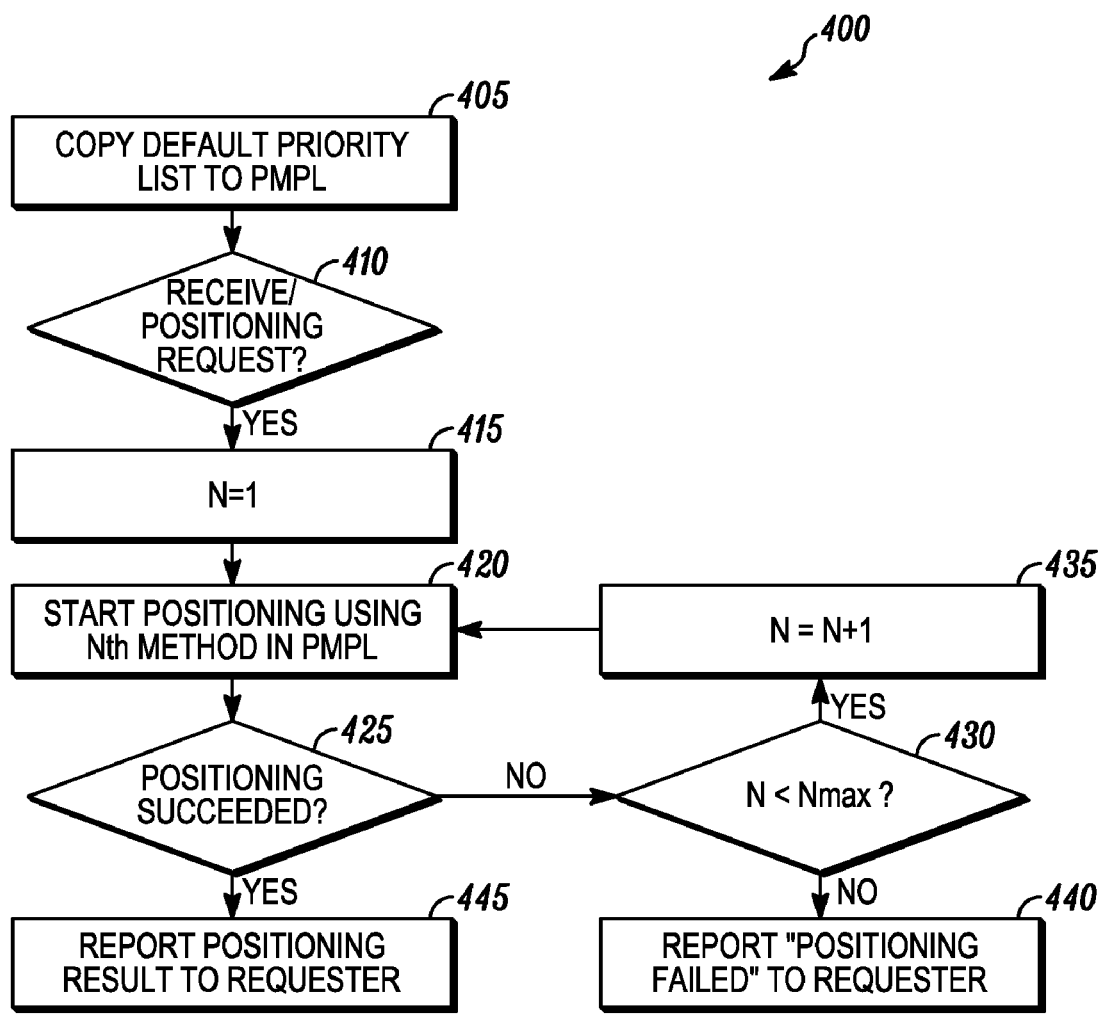
FIG. 4 is a flow diagram illustrating a method for iteratively determining whether any positioning method identified in a positioning method priority list satisfies quality of position (QOP) parameters identified in a positioning request for location services (LCS), according to some embodiments of the present invention.

Referring to FIG. 4, a flow diagram illustrates a method 400 for iteratively determining whether any positioning method identified in a positioning method priority list satisfies quality of position (QOP) parameters identified in a positioning request for location services (LCS), according to some embodiments of the present invention. At step 405, when the mobile telephone 100 is first powered on the data from the DPL 270 is copied to the PMPL 265. At step 410 it is then determined whether a positioning request has been received. If so, a variable N is set to a value of one. At step 420, the PSP 205 initiates a positioning method that corresponds to the first priority method in the PMPL 265. At step 425 it is determined whether the first priority method succeeded in providing a positioning fix that satisfied the required QOP parameters. If not, then at step 430 it is determined whether N is less than a maximum number of positioning methods available to the mobile telephone 100. If so, at step 435 the value of N is incremented by one and the method 400 returns to step 420; if not, then a "positioning failed" message is reported to the LCS requestor. At step 445, if one of the available positioning methods succeeds, then the associated positioning result is reported to the LCS requestor.

Figure 5:
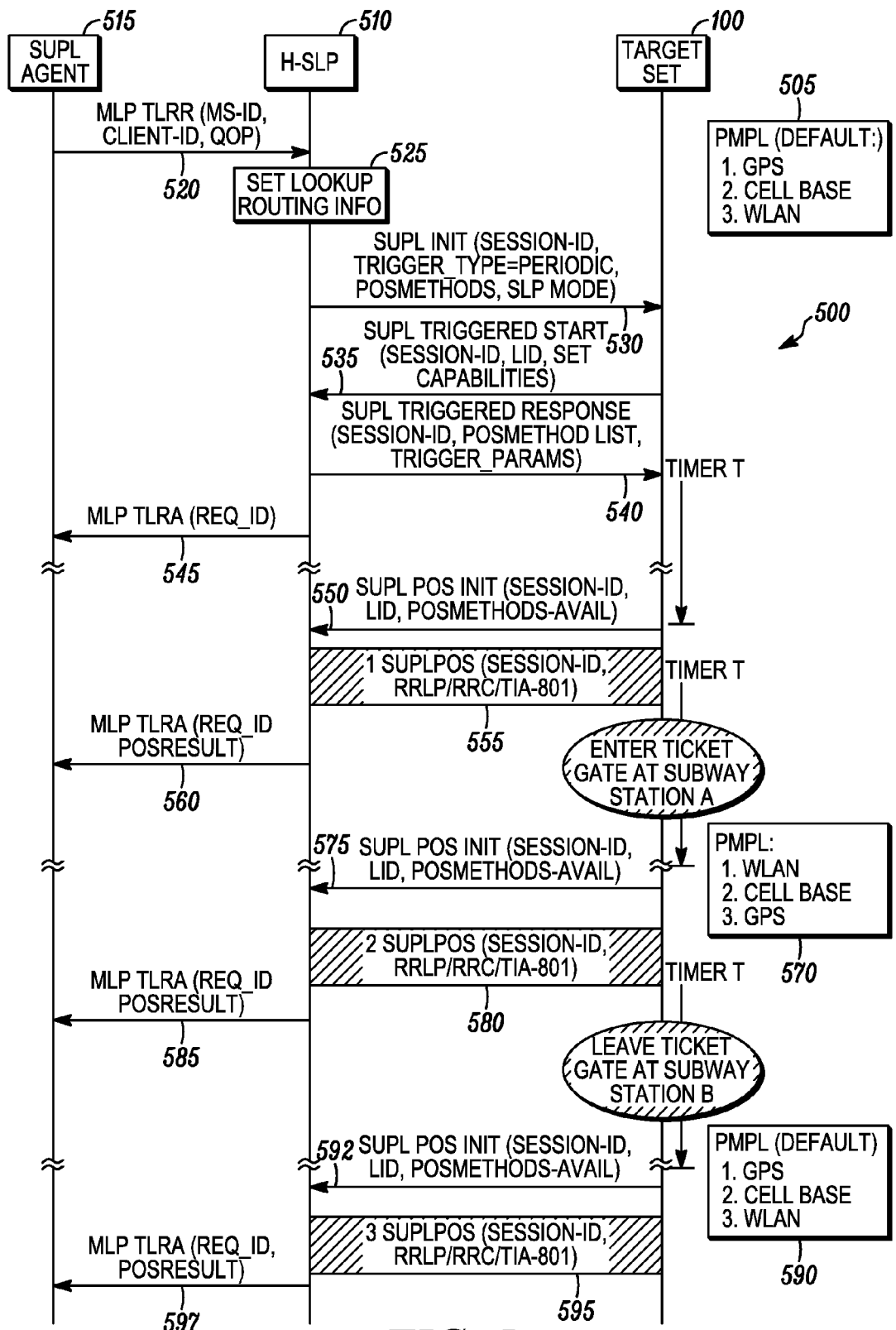
FIG. 5 is a message sequence chart illustrating a method of updating a positioning method priority list (PMPL) in response to movement of a mobile telephone through a subway system, according to some embodiments of the present invention.

Referring to FIG. 5, a message sequence chart illustrates a method 500 of updating the positioning method priority list (PMPL) 265 in response to movement of the mobile telephone 100 through a subway system, according to some embodiments of the present invention. As shown in block 505, consider that the PMPL 265 initially prioritizes three available positioning methods, where use of the GPS transceiver 210 is assigned a first priority, use of the cell transceiver 108 is assigned a second priority, and use of the WLAN transceiver 220 is assigned a tertiary priority. Also consider that the mobile telephone 100 can function as a target SUPL enabled terminal (SET) that is in communication, such as through the network 250, with a home SUPL location platform (H-SLP) 510. Further, consider that the H-SLP 510 is in communication, such as through the network 250, with a SUPL agent 515. A mobile location protocol triggered location reporting request (MLP TLRR) 520 is transmitted from the SUPL agent 515 to the H-SLP 510, and indicates that a current location of the mobile telephone 100 has been requested. The H-SLP 510 therefore looks up routing information for the mobile telephone 100 in a routing table 525 and transmits a SUPL initiation (INIT) message 530 to the mobile telephone 100. The mobile telephone 100 then responds with a SUPL TRIGGERED START message 535 that identifies SET capabilities including the positioning methods identified in the PMPL 265. The mobile telephone 100 then receives a SUPL TRIGGERED RESPONSE message 540, which indicates preferred positioning methods of the H-SLP 510, and sets a timer T. The H-SLP 510 then transmits a mobile location protocol triggered location reporting answer (MLP TLRA) 545 to the SUPL agent 515. After expiration of the timer T, the PSP 205 copies the PMPL 265 to a posmethods-avail field in a SUPL positioning initiation (POS INIT) message 550 that is transmitted to the H-SLP 510. A first SUPL positioning session 555 is then started using the GPS transceiver 210, and another timer T is started. A MTP TLRA 560 including results of the first SUPL positioning session 555 is then transmitted from the H-SLP 510 to the SUPL agent 515.

At point 565, consider that a user of the mobile telephone 100 enters a subway using a ticket gate at a subway station A that includes an RFID reader/writer 255. By employing the method 300 described above, the PMPL 265 is updated. Block 570 illustrates the updated PMPL 265, where the three available positioning methods are reprioritized so that use of the WLAN transceiver 220 is assigned a first priority, use of the cell transceiver 108 is assigned a second priority, and use of the GPS transceiver 210 is assigned a tertiary priority. When the timer T again expires, the mobile telephone 100 transmits a SUPL POS INIT message 575 to the H-SLP 510. A second SUPL positioning session 580 is then started using the WLAN transceiver 220, and another timer T is started. A MTP TLRA 585 including results of the second SUPL positioning session 580 is then transmitted from the H-SLP 510 to the SUPL agent 515.

At point 587, consider that a user of the mobile telephone 100 leaves the subway using a ticket gate at a subway station B that includes another RFID reader/writer 255. By employing the method 300 described above, the PMPL 265 is again updated. Block 590 illustrates the updated PMPL 265, where the three available positioning methods are reprioritized so that use of the GPS transceiver 210 is assigned a first priority, use of the cell transceiver 108 is assigned a second priority, and use of the WLAN transceiver 220 is assigned a tertiary priority. When the timer T again expires, the mobile telephone 100 transmits a SUPL POS INIT message 592 to the H-SLP 510. A third SUPL positioning session 595 is then started using the GPS transceiver 210. A MTP TLRA 597 including results of the third SUPL positioning session 595 is then transmitted from the H-SLP 510 to the SUPL agent 515.

Therefore, according to the method 500, the PMPL 265 is automatically updated to identify the WLAN transceiver 220 as a source of a preferred positioning method while a user of the mobile telephone 100 is within the subway. But each of the available positioning methods that use the transceivers 108, 210, 215, and 220 do not need to be tested in order to determine that the WLAN transceiver 220 is preferred, thus conserving battery power and processor resources in the mobile telephone 100, and bandwidth resources in both the network 200 and the network 250.

Figure 6:
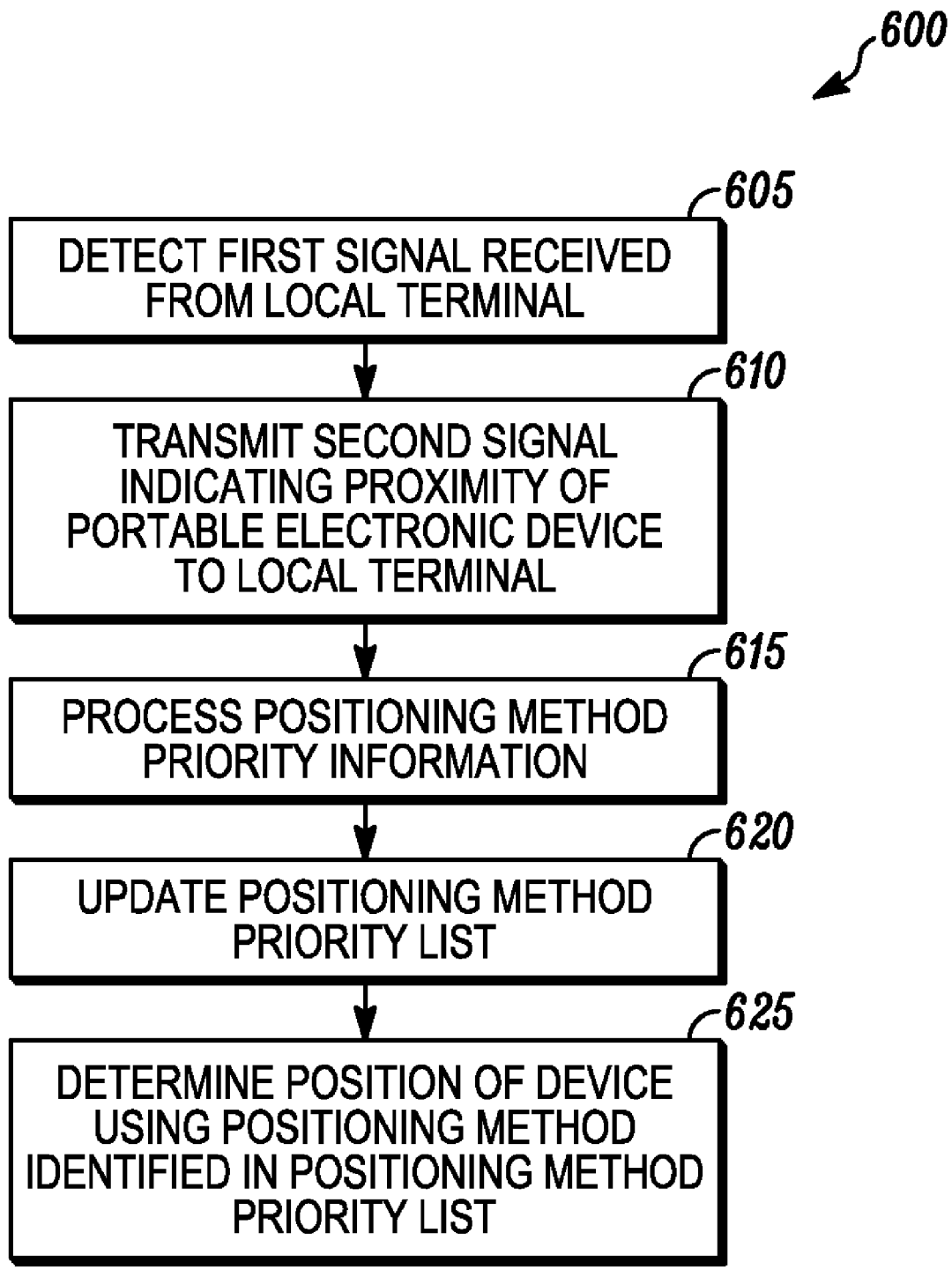
FIG. 6 is a general flow diagram illustrating a method for determining a position of a portable electronic device, according to some embodiments of the present invention.

Referring to FIG. 6, a general flow diagram illustrates a method 600 for determining a position of a portable electronic device, according to some embodiments of the present invention. At step 605, a first signal received from a local terminal is detected. For example, the RFID tag 119 detects a signal from the RFID reader/writer 255.

At step 610, a second signal indicating a proximity of the portable electronic device to the local terminal is transmitted from the portable electronic device in response to the first signal. For example, the RFID tag 119 transmits a response signal back to the RFID reader/writer 255. According to some embodiments of the present invention, transmitting the second signal is performed using power from a wireless excitation signal received from the local terminal, such as an electrical induction signal from the RFID reader/writer 255.

At step 615, positioning method priority information, which is based on a location of the local terminal and is received from the local terminal in response to the second signal, is processed. For example, such processing can comprise reading the positioning method priority information from a radio frequency identification tag in the portable electronic device, such as where the RFID tag 119 receives positioning method priority information from the RFID reader/writer 255 that is based on the location of the RFID reader/writer 255 in a subway, train station, bus station, public building, or vehicle, and the information is then read by the PMS module 260. Further, the positioning method priority information can comprise a current position of the portable electronic device, such as specific latitude and longitude coordinates. That can further reduce the need for a portable electronic device to employ one or more of its available positioning methods.

At step 620, a positioning method priority list based on the positioning method priority information is updated. For example, according to the method 300 the PMPL 265 is updated.

At step 625, the position of the portable electronic device is determined using a positioning method identified in the positioning method priority list. For example, the position of the mobile telephone 100 is determined using a positioning method that employs the WLAN transceiver 220 based on a WLAN priority identified in the PMPL 265.

Although various embodiments of the present invention have been described in relation to the mobile telephone 100, those skilled in the art will appreciate that embodiments of the present invention can be included in various other types of portable electronic devices, such as notebook computers, personal digital assistants (PDAs), handheld radios, vehicle location systems, and various other electronic appliances that may employ location services (LCS).

Advantages of the present invention thus include enabling a portable electronic device to determine an appropriate positioning method in a particular circumstance or location without needing to execute and test various available positioning methods. The portable electronic device is thus able to conserve battery and processor resources of the device, and conserve bandwidth resources of a network to which the device is connected.

It will be appreciated that embodiments of the invention described herein may be comprised of one or more conventional processors and unique stored program instructions that control the one or more processors to implement, in conjunction with certain non-processor circuits, some, most, or all of the functions of determining a position of a portable electronic device as described herein. The non-processor circuits may include, but are not limited to, a radio receiver, a radio transmitter, signal drivers, clock circuits, power source circuits, and user input devices. As such, these functions may be interpreted as steps of a method for determining a position of a portable electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

I claim:

1. A method for determining a position of a portable electronic device, the method comprising:
   detecting a first signal received from a local terminal;
   transmitting from the portable electronic device, in response to the first signal, a second signal indicating a proximity of the portable electronic device to the local terminal;
   processing positioning method priority information, which identifies a ranked list of a plurality of positioning methods, is based on a location of the local terminal and is received from the local terminal in response to the second signal;
   updating a positioning method priority list based on the positioning method priority information; and
   determining the position of the portable electronic device using a positioning method identified in the positioning method priority list.

2. The method of claim 1, wherein the second signal is transmitted from a radio frequency identification tag.

3. The method of claim 1, wherein the first and second signals are near field communications.

4. The method of claim 1, wherein the positioning method priority list is updated before executing any positioning method identified in the positioning method priority list.

5. The method of claim 1, further comprising changing the positioning method priority list to a default priority list after the expiration of a predetermined time period.

6. The method of claim 1, wherein the positioning method priority information comprises a current position of the portable electronic device.

7. The method of claim 1, wherein processing the positioning method priority information comprises reading the positioning method priority information from a radio frequency identification tag in the portable electronic device.

8. The method of claim 1, wherein the positioning method priority list identifies positioning methods selected from the following methods: satellite based, cell based, short range wireless based, radio frequency identification based, and hybrid positioning methods.

9. The method of claim 1, wherein the positioning method priority information identifies a single preferred positioning method.

10. A portable electronic device comprising:
    a computer readable medium comprising:
    computer readable program code components configured to cause detecting a first signal received from a local terminal;
    computer readable program code components configured to cause transmitting from the portable electronic device, in response to the first signal, a second signal indicating a proximity of the portable electronic device to the local terminal;
    computer readable program code components configured to cause processing positioning method priority information, which identifies a ranked list of a plurality of positioning methods, is based on a location of the local terminal and is received from the local terminal in response to the second signal;

computer readable program code components configured to cause updating a positioning method priority list based on the positioning method priority information; and computer readable program code components configured to cause determining the position of the portable electronic device using a positioning method identified in the positioning method priority list.

11. The device of claim 10, wherein the first and second signals are near field communications.

12. The device of claim 10, wherein the positioning method priority list is updated before executing any positioning method identified in the positioning method priority list.

13. The device of claim 10, further comprising computer readable program code components configured to cause changing the positioning method priority list to a default priority list after the expiration of a predetermined time period.

14. The device of claim 10, wherein the positioning method priority information comprises a current position of the portable electronic device.

15. The device of claim 10, wherein processing the positioning method priority information comprises reading the positioning method priority information from a radio frequency identification tag in the portable electronic device.

16. A method for determining a position of a portable electronic device, the method comprising:

detecting a first signal received from a local terminal;

transmitting from the portable electronic device, in response to the first signal, a second signal indicating a proximity of the portable electronic device to the local terminal;

processing positioning method priority information, which is based on a location of the local terminal and is received from the local terminal in response to the second signal;

updating a positioning method priority list based on the positioning method priority information, wherein the positioning method priority list is updated before executing any positioning method identified in the positioning method priority list; and determining the position of the portable electronic device using a positioning method identified in the positioning method priority list.

17. A method for determining a position of a portable electronic device, the method comprising:

detecting a first signal received from a local terminal;

transmitting from the portable electronic device, in response to the first signal, a second signal indicating a proximity of the portable electronic device to the local terminal;

processing positioning method priority information, which is based on a location of the local terminal and is received from the local terminal in response to the second signal;

updating a positioning method priority list based on the positioning method priority information;

determining the position of the portable electronic device using a positioning method identified in the positioning method priority list; and changing the positioning method priority list to a default priority list after the expiration of a predetermined time period.

18. A method for determining a position of a portable electronic device, the method comprising:

detecting a first signal received from a local terminal;

transmitting from the portable electronic device, in response to the first signal, a second signal indicating a proximity of the portable electronic device to the local terminal, wherein transmitting the second signal is performed using power from a wireless excitation signal received from the local terminal;

processing positioning method priority information, which is based on a location of the local terminal and is received from the local terminal in response to the second signal;

updating a positioning method priority list based on the positioning method priority information; and determining the position of the portable electronic device using a positioning method identified in the positioning method priority list.

19. A method for determining a position of a portable electronic device, the method comprising:

detecting a first signal received from a local terminal;

transmitting from the portable electronic device, in response to the first signal, a second signal indicating a proximity of the portable electronic device to the local terminal;

processing positioning method priority information, which is based on a location of the local terminal and is received from the local terminal in response to the second signal;

updating a positioning method priority list based on the positioning method priority information; and determining the position of the portable electronic device using a positioning method identified in the positioning method priority list;

wherein the method conforms to the Open Mobile Alliance Secure User Plane Location 2.0 Periodic Trigger standard.

20. A portable electronic device comprising:

a computer readable medium comprising:

computer readable program code components configured to cause detecting a first signal received from a local terminal;

computer readable program code components configured to cause transmitting from the portable electronic device, in response to the first signal, a second signal indicating a proximity of the portable electronic device to the local terminal, wherein the second signal is transmitted from a radio frequency identification tag;

computer readable program code components configured to cause processing positioning method priority information, which is based on a location of the local terminal and is received from the local terminal in response to the second signal;

computer readable program code components configured to cause updating a positioning method priority list based on the positioning method priority information; and computer readable program code components configured to cause determining the position of the portable electronic device using a positioning method identified in the positioning method priority list.

* * * * *